(12) United States Patent
Tao et al.

(10) Patent No.: US 7,630,355 B2
(45) Date of Patent: Dec. 8, 2009

(54) METHOD AND SYSTEM FOR ENABLING HARQ OPERATIONS ON CHANNELS BETWEEN STATIONS IN WIRELESS COMMUNICATION NETWORKS

(75) Inventors: Zhifeng Tao, Allston, MA (US); Toshiyuki Kuze, Kanagawa (JP); Shigeru Uchida, Kanagawa (JP); Kentarou Sawa, Fujisawa (JP); Koon Hoo Teo, Lexington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 562 days.

(21) Appl. No.: 11/620,123

(22) Filed: Jan. 5, 2007

(65) Prior Publication Data

US 2008/0165670 A1 Jul. 10, 2008

(51) Int. Cl.
*H04J 1/00* (2006.01)

(52) U.S. Cl. .................... 370/343; 370/319; 714/748

(58) Field of Classification Search .................. None
See application file for complete search history.

(56) References Cited

OTHER PUBLICATIONS

"IEEE Standard for Local and Metropolitan Area Networks—Part 16: Air Interface for Fixed Broadband Wireless Access Systems," IEEE Computer Society and the IEEE Microwave Theory and Techniques Society, Oct. 2004.
"IEEE Standard for Local and Metropolitan Area Networks—Part 16: Air Interface for Fixed Broadband Wireless Access Systems, Amendment 2: Physical and Medium Access Control Layers for Combined Fixed and Mobile Operation in Licensed Bands," IEEE Computer Society and the IEEE Microwave Theory and Techniques Society, Feb. 2006, pp. 218-221, 403-419, 485-496, 648-650.
"Harmonized definitions and terminology for IEEE 802.16j Mobile Multihop Relay," IEEE 802.16j-06/014r1, Oct. 2006.

*Primary Examiner*—Jayanti K Patel
*Assistant Examiner*—Matthew Campbell
(74) *Attorney, Agent, or Firm*—Dirk Brinkman; Gene Vinokur (57) ABSTRACT

A method and system enables and improves performance of hybrid automatic repeat request (HARQ) operations on channels between stations of an orthogonal frequency division multiple access (OFDMA) wireless communication network. There, the number of parallel HARQ channels is increased adaptively, and one connection identifier is used to unambiguously identify a set of MAC protocol data units (MPDUs) communicated over parallel HARQ channels. A sequence number is used to avoid out-of-order MPDU delivery when MPDUs are transmitted over parallel HARQ channels. The MPDUs can be concatenated or encapsulated. The maximum number of the parallel HARQ channels can be increased to 256, and can be negotiated when a station enters or re-enters the network.

23 Claims, 8 Drawing Sheets

METHOD AND SYSTEM FOR ENABLING HARQ OPERATIONS ON CHANNELS BETWEEN STATIONS IN WIRELESS COMMUNICATION NETWORKS

FIELD OF THE INVENTION

This invention relates generally to mobile wireless networks, and in particular to method and system for enabling and improving performance of hybrid automatic repeat requests (HARQ) on wireless channels.

BACKGROUND OF THE INVENTION

OFDM

Orthogonal frequency-division multiplexing (OFDM) is frequently used to mitigate multi-path interference in a physical layer (PHY) of channels of wireless communication networks. Therefore, OFDM is specified for a number of wireless communications standards, e.g., IEEE 802.11a/g, and IEEE 802.16/16e, "IEEE Standard for Local and Metropolitan Area Networks—Part 16: Air Interface for Fixed Broadband Wireless Access systems," IEEE Computer Society and the IEEE Microwave Theory and Techniques Society, October 2004, and "IEEE Standard for Local and Metropolitan Area Networks—Part 16: Air Interface for Fixed Broadband Wireless Access Systems, Amendment 2: Physical and Medium Access Control Layers for Combined Fixed and Mobile Operation in Licensed Bands," IEEE Computer Society and the IEEE Microwave Theory and Techniques Society, February 2006, both incorporated herein by reference.

OFDMA

Based on the OFDM, orthogonal frequency division multiple access (OFDMA) has been developed. With OFDMA a separate sets of orthogonal tones (frequencies) are allocated to multiple transceivers (users) so that these transceivers can engage in parallel communication. For an example, the IEEE 802.16/16e standard has adopted OFDMA as the multiple channel access mechanism for non-line-of sight (NLOS) communications in frequency bands below 11 GHz.

HARQ

Hybrid automatic repeat-request (HARQ) operations can be used for error control in wireless networks. With HARQ, the receiver detects an error in a message and automatically requests a retransmission of the message from the transmitter. In response to receiving the HARQ, the transmitter retransmits the message until it is received correctly, unless the error persists. In one variation, HARQ combines forward error correction (FEC) with an error-correction code.

HARQ operation requires support at both the PHY and link level, i.e., layer 1 and 2 in the OSI protocol model, to provide a desired reliability on the wireless channels. Many existing wireless systems have adopted HARQ to deal with adverse wireless channels and improve reliability. For example, HARQ is used as an optional feature in the IEEE 802.16e standard for the OFDMA PHY.

However, an ambiguity can arise when the HARQ protocol, as defined in the current IEEE 802.16e standard, is applied on concatenated MAC protocol data units (MPDU). In addition, conventional HARQ unexpectedly prevents the wireless channel resources from being fully utilized. This is a serious problem for relay channels in mobile multihop relay networks, or next generation advanced IEEE 802.16 networks, as high capacity is one of the requirements for such networks.

To address these problems, new protocols are required.

For sake of clarify and brevity, some terminologies and acronyms are defined herein as follows.

Subscriber station (SS): a generalized equipment set providing connectivity between subscriber equipment and a base station (BS).

Mobile station (MS): a station in mobile service intended to be used while in motion or during halts at unspecified points. An MS is always a subscriber station (SS) unless specifically expected otherwise in the standard.

Relay station (RS): a station that conforms to the IEEE Std 802.16j standard and whose functions are 1) to relay data and possibly control information between other stations, and 2) to execute processes that indirectly support mobile multihop relay, see "Harmonized definitions and terminology for IEEE 802.16j Mobile Multihop Relay," IEEE 802.16j-06/014rl, October 2006, incorporated herein by reference.

Protocol data unit (PDU): a set of data specified in a protocol of a given layer and including protocol control information of that layer, and possibly user data of that layer, see W. Stallings, "Data and Computer Communications", Seventh edition, Prentice Hall, 2003, incorporated herein by reference.

Service data unit (SDU): the protocol data unit of a certain protocol layer that includes the service data unit coming from the higher layer and the protocol control information of that layer.

SUMMARY OF THE INVENTION

A method and system enables hybrid automatic repeat request (HARQ) operations on channels between stations of an orthogonal frequency division multiple access (OFDMA) wireless communication network. There, the number of parallel HARQ channels is increasing adaptively, and one connection identifier is used to unambiguously identify a set of MAC protocol data units (MPDUs) communicated over the parallel HARQ channels. The MPDUs can be concatenated or encapsulated. The maximum number of the parallel HARQ channels can be increased to 256, and can be negotiated when a station enters the network.

DETAILED DESCRIPTION OF THE PREFERRED EMBODIMENTS

HARQ Operation in IEEE 802.16e-2005

Hybrid automatic repeat request (HARQ) is an optional feature defined in the IEEE 802.16-2004 and 802.16e-2005 standards for the OFDMA physical (PHY) layer. The HARQ protocol, which requires both physical layer and media access (MAC) layer support, is a typical example of cross-layer system design for wireless communication networks.

At the physical layer, two specific techniques, namely chase combining (CC) and incremental redundancy (IR), provide coding gain and additional redundancy gain. In addition, a stop-and-wait mechanism at the MAC layer provides automatic repeat request (ARQ) capability.

Because the technical specification related to HARQ in the IEEE 802.16-2004 standard has been modified in the IEEE802.16e-2005 standard, the HARQ protocol defined in the IEEE 802.16e-2005 standard is used as a basis for further improvement and enhancement, as described herein.

Figure 1:
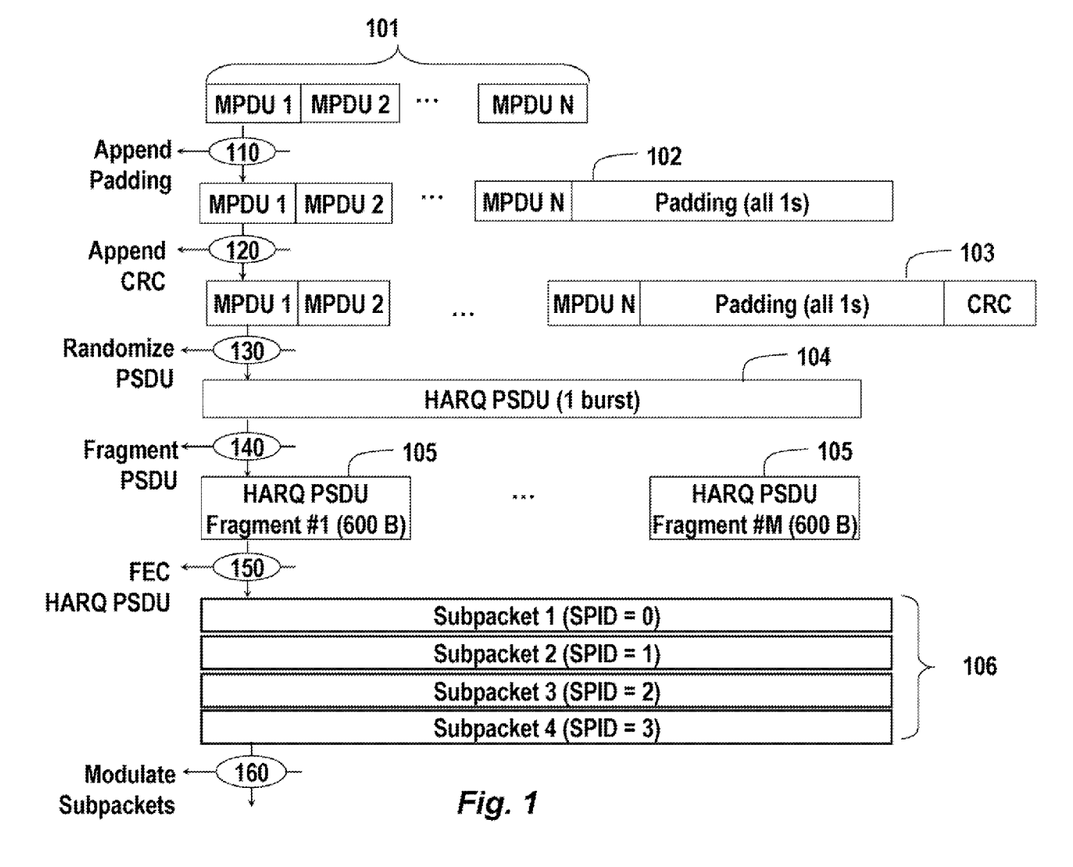
FIG. 1 is a block diagram of HARQ operation for a transmitter according to an embodiment of the invention.

FIG. 1 shows the basic HARQ operation at a transmitter. A single MAC PDU (MPDU) or a concatenation of multiple MPDUs 101 are passed down from the MAC layer of the transmitter for the HARQ operation.

If needed, padding bits 102 are appended 110 at the end of the MPDU or concatenated MPDUs 101. The set of permissible paddings is {4, 10, 16, 22, 34, 46, 58, 118, 238, 358, 598, 1198, 1798, 2398, 2998} bits.

Then, a sixteen-bit cyclic redundancy check (CRC-16) field 103 is appended 120. The permissible set can be {6, 12, 18, 24, 36, 48, 60, 120, 240, 360, 600, 1200, 1800, 2400, 3000} bits.

After randomization 130, the resultant HARQ physical layer SDU (PSDU) 104 should have a length that is a multiple of 600 bytes, i.e., 4800 bits.

If the total length of the HARQ PSDU is longer than 600 bytes, the PSDU is fragmented 140 into fragments 105 no larger than 600 bytes each. Each fragment is encoded separately. The HARQ level fragmentation is needed, because the longest data unit that the forward correction coding (FEC) 150 defined in the IEEE standard can handle is of 600 bytes.

Four subpackets 106 are be generated for each HARQ PSDU, regardless of whether HARQ fragmentation occurs or not. The subpackets are modulated 160 and transmitted to a receiver.

To simplify this description, we call HARQ PSDU 104, including the optional padding bits 102 and appended CRC field 103, the original encoder packet in the following description, because the four subpackets 106 are directly derived from the HARQ PSDU 104.

Figure 2:
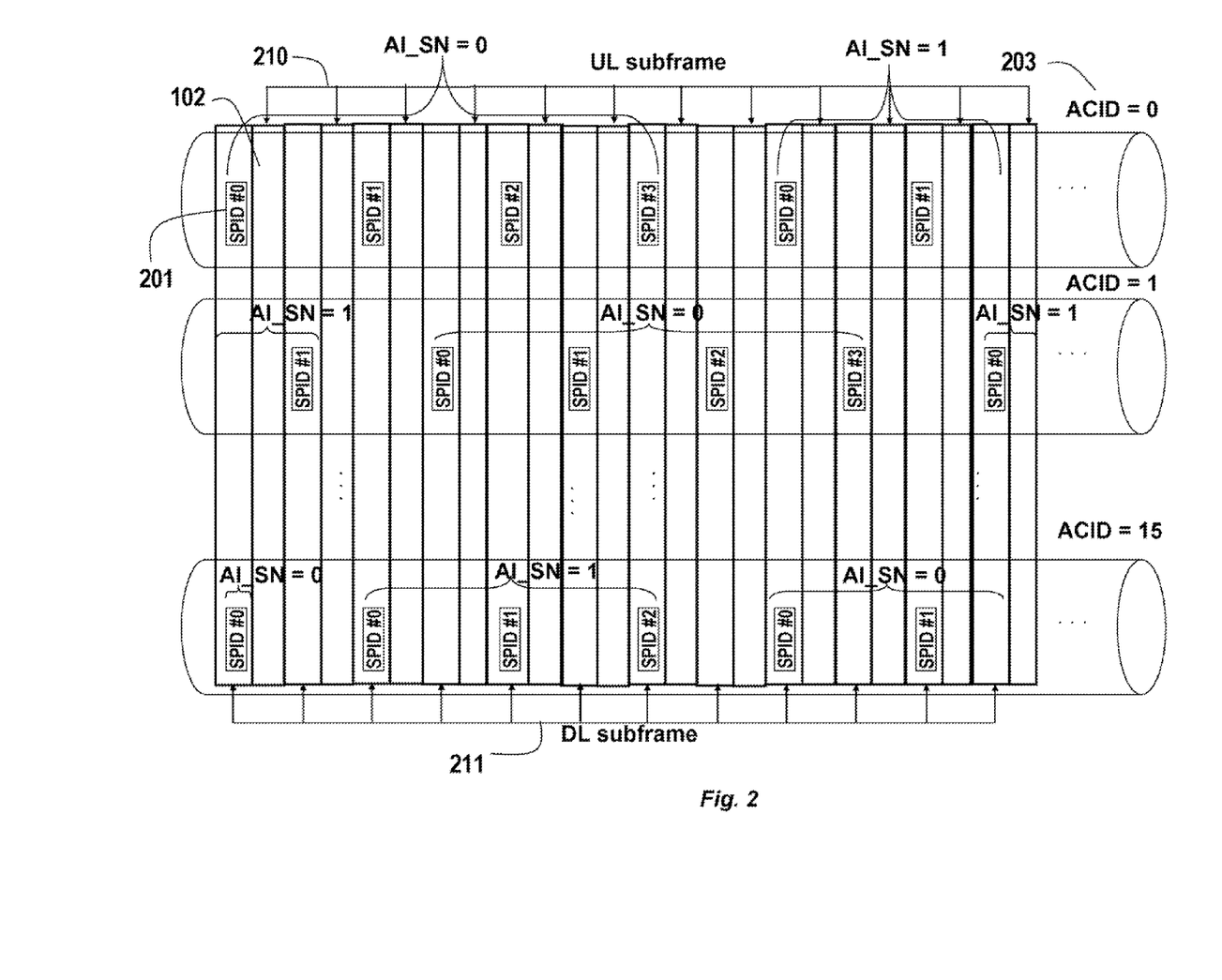
FIG. 2 is a block diagram of relations among three operation parameters for the HARQ as shown in FIG. 1.

FIG. 2 shows a high level structure for an uplink (UL) subframe 211 and a downlink (DL) subframe 211. The HARQ operation is regulated by three key parameters, namely a subpacket identifier (SPID) 201, a HARQ identifier sequence number (AI_SN) 202, and a HARQ channel identifier (ACID) 103. FIG. 2 shows how the SPID, AI_SN and ACID control the packet flow.

Basically, the original encoder packet 104 is encoded 150 using the FEC. As a result, the four subpackets 106 are generated. Each subpacket is uniquely identified with a 2-bit SPID. More specifically, the SPIDs for these four subpackets are "0x00", "0x01", "0x10" and "0x11", respectively. The transmitter sends the subpacket with SPID "0x00" first. If the receiver can correctly decode this subpacket, the receiver sends a positive acknowledgement (ACK) to the transmitter. Thus, there is no need for the transmitter to send subsequent subpackets that belong to the same original encoder packet.

However, if the receiver fails to decode the first subpacket, then the receiver indicates a failure to the transmitter by sending a negative acknowledgement (NAK). In that case, the transmitter selects another subpacket out of the four and transmit the selected subpacket to the receiver. This process continues until either the receiver decodes the original encoder packet correctly, or four such transmission attempts all fail.

In the downlink from a base station (BS) to a SS or MS, the HARQ mechanism provides a dedicated PHY channel for the SS or the MS to transmit the ACK or the NACK, after a predetermined delay. Although this acknowledgement process is synchronous, the retransmission of the subpacket can be non-deterministic.

It is possible for the receiver to receive two consecutive subpackets, each of which belongs to a different original encoder placket. This can occur when the transmitter detects the transmission failure of all four subpackets that belong to the same original encoder packet. Thus, the transmitter starts transmitting the first subpacket of a next original encoder packet.

To avoid confusion, a 1-bit AI_SN is used to indicate whether a next original encoder packet has started. Effectively, this AI_SN bit toggles between 0 and 1, whenever the subpacket of the next original encoder packet is transmitted. After the receiver recognizes such a toggling, the receiver knows that the transmitter HARQ has forsaken the handling of the previous original encoder packet, and the receiver should discard the subpacket it has for that original encoder packet.

The HARQ according to the IEEE 802.16e-2005 standard also supports the operation of multiple parallel channels, each of which may have an encoded packet pending. Each HARQ channel can be uniquely identified by the four-bit ACID field 203, as shown in FIG. 2. Note that HARQ channels are defined on a per connection basis.

Proper management facilities have to be provided for the data plane HARQ operation. In the IEEE 802.16e-2005 standard, a HARQ DL MAP IE and HARQ UP MAP IE are defined to inform the SS or MS of the resource allocation associated with HARQ. As shown in Table 1 and Table 2, both information elements (IE) follow the format of OFDMA DL-MAP extended-2 IE format specified in the IEEE 802.16e-2005 standard, both incorporated herein by reference.

TABLE 1

HARQ DL MAP IE format

| Syntax | Size |
|---|---|
| HARQ DL MAP IE { | |
|   Extended-2 DIUC | 4 bits |
|   Length | 8 bits |
|   RCID_Type | 2 bits |
|   Reserved | 2 bits |
|   While (data remains) { | |
|     Boosting | 3 bits |
|     Region_ID use indicator | 1 bit |
|     If (Region_ID use indicator == 0) { | |
|       *OFDMA symbol offset* | 8 bits |
|       *Subchannel offset* | 7 bits |
|       *Number of OFDMA symbols* | 7 bits |
|       *Number of subchannels* | 7 bits |
|       Reserved | 3 bits |
|     } else { | |
|       Region_ID | 8 bits |
|     } | |
|     Mode | 4 bits |
|     Sub-burst IE length | 8 bits |
|     If (Mode == 0b0000) { | |
|       DL HARQ Chase sub-burst IE( ) | Variable |
|     } else if (Mode == 0b0001) { | |
|       DL HARQ IR CTC sub-burst IE( ) | Variable |
|     } else if (Mode == 0b0010) { | |
|       DL HARQ IR CC sub-burst IE( ) | Variable |
|     } else if (Mode == 0b0011) { | |

TABLE 1-continued

HARQ DL MAP IE format

| Syntax | Size |
|---|---|
|     MIMO DL Chase HARQ Sub-burst IE( ) | Variable |
|   } else if (Mode == 0b0100) { | |
|     MIMO DL IR HARQ Sub-burst IE( )( ) | Variable |
|   } else if (Mode == 0b0101) { | |
|     MIMO DL IR HARQ for CC Sub-burst IE( ) | Variable |
|   } else if (Mode == 0b0110) { | |
|     MIMO DL STC HARQ Sub-burst IE( ) | Variable |
|   } | |
| Padding | Variable |

TABLE 2

HARQ UL MAP IE format

| Syntax | Size |
|---|---|
| HARQ UL MAP IE { | |
|   Extended-2 DIUC | 4 bits |
|   Length | 8 bits |
|   RCID_Type | 2 bits |
|   Reserved | 2 bits |
|   While (data remains) { | |
|     Mode | 3 bits |
|     Allocation Start Indication | 1 bit |
|     If (Allocation Start Indication == 1) { | |
|       *OFDMA symbol offset* | 8 bits |
|       *Subchannel offset* | 7 bits |
|       Reserved | 1 bits |
|     } | |
|     N sub Burst | 4 bits |
|     For ( i=0; i<N sub Burst; i++ ) { | |
|       If (Mode == 0b000) { | |
|         UL HARQ Chase sub-burst IE( ) | Variable |
|       } else if (Mode == 0b001) { | |
|         UL HARQ IR CTC sub-burst IE( ) | Variable |
|       } else if (Mode == 0b010) { | |
|         UL HARQ IR CC sub-burst IE( ) | Variable |
|       } else if (Mode == 0b011) { | |
|         MIMO UL Chase HARQ Sub-burst IE( ) | Variable |
|       } else if (Mode == 0b100) { | |
|         MIMO UL IR HARQ Sub-burst IE( )( ) | Variable |
|       } else if (Mode == 0b101) { | |
|         MIMO UL IR HARQ for CC Sub-burst IE( ) | Variable |
|       } else if (Mode == 0b110) { | |
|         MIMO UL STC HARQ Sub-burst IE( ) | Variable |
|       } | |
|     } | |
| } | |
| Padding | Variable |

Figure 3A:
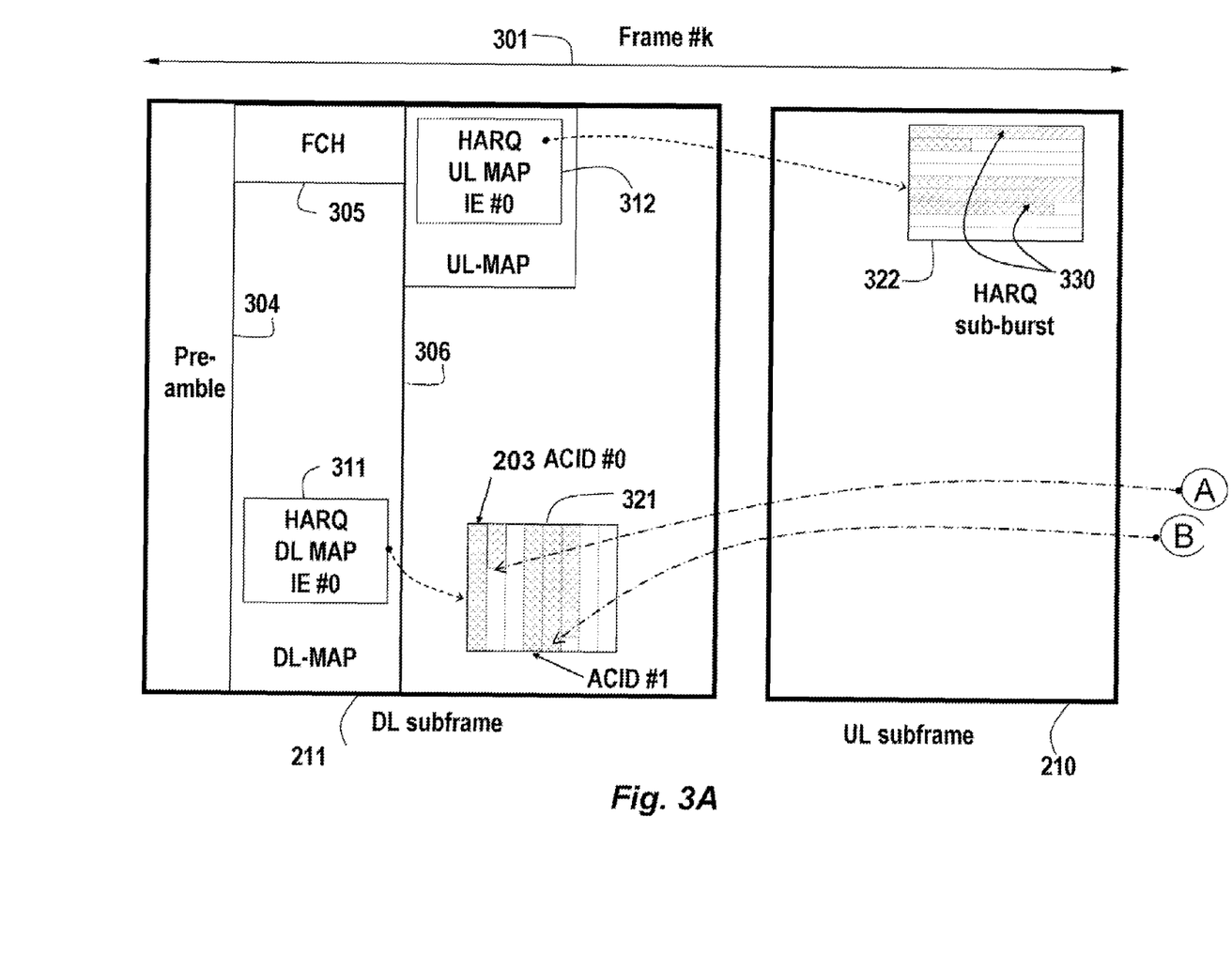
FIGS. 3A-3C are block diagram of the HARQ operation with an OFDMA frame structure according to an embodiment of the invention.
Figure 3B:
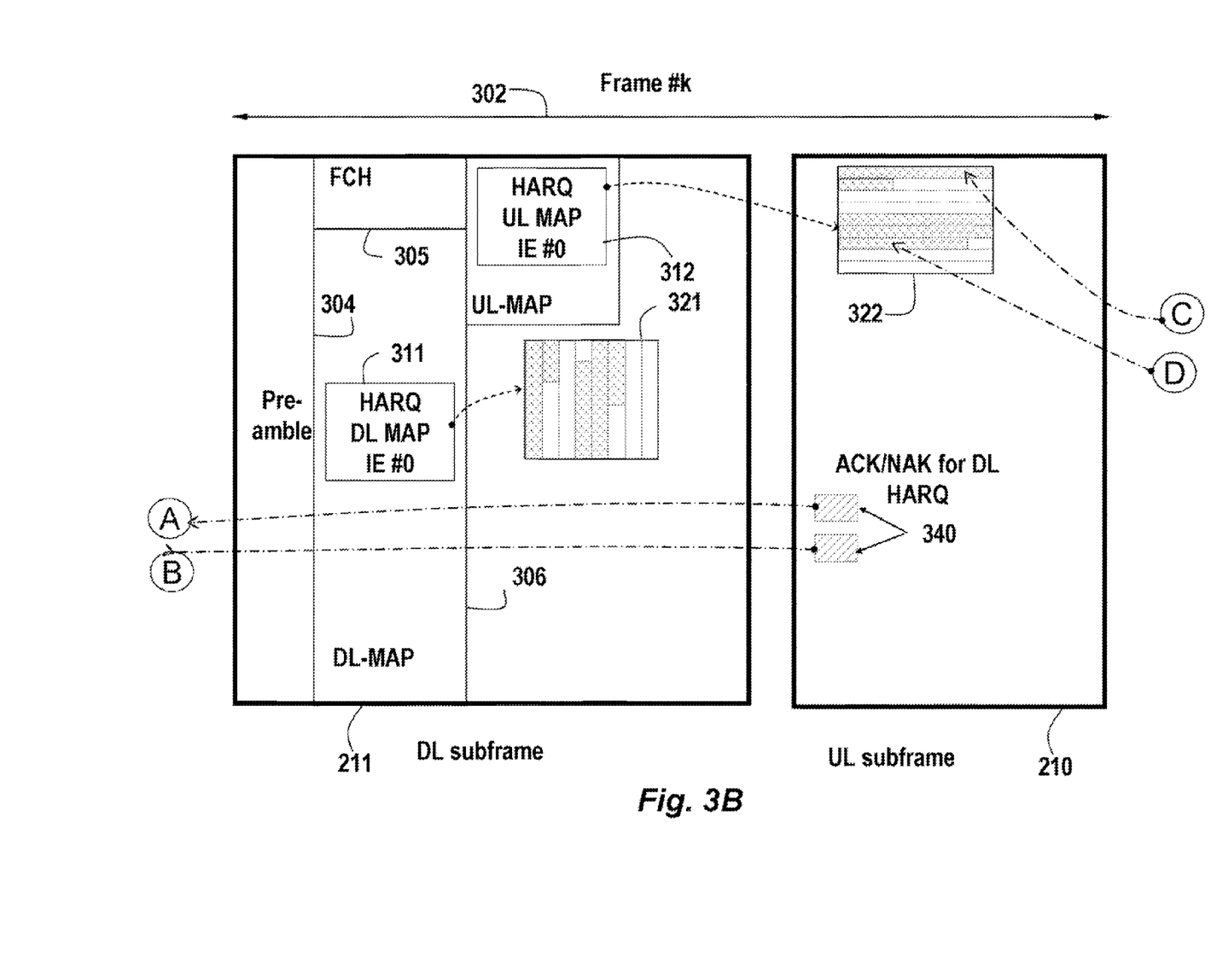

FIGS. 3A-3B shows a succession of three (#k) frames 301-303. Each frame includes a DL-frame 211 with a preamble 304, frame control header (FCH) 305 and DL map 306, and an UL-frame 210. Each HARQ DL MAP IE 311 and HARQ UL MAP IE 312 specifies corresponding resource regions 321-322 in the DL subframe and UL subframe, respectively, see letters A, B, C and D for linkages between the FIGS. 3A-3C and subsequent frames. A resource region can further comprise multiple sub regions, which are called sub-bursts 330. The mode-dependent information element (IE) in HARQ DL MAP IE, and HARQ UL MAP IE unambiguously link each such sub-burst with a specific HARQ subpacket.

Figure 3C:
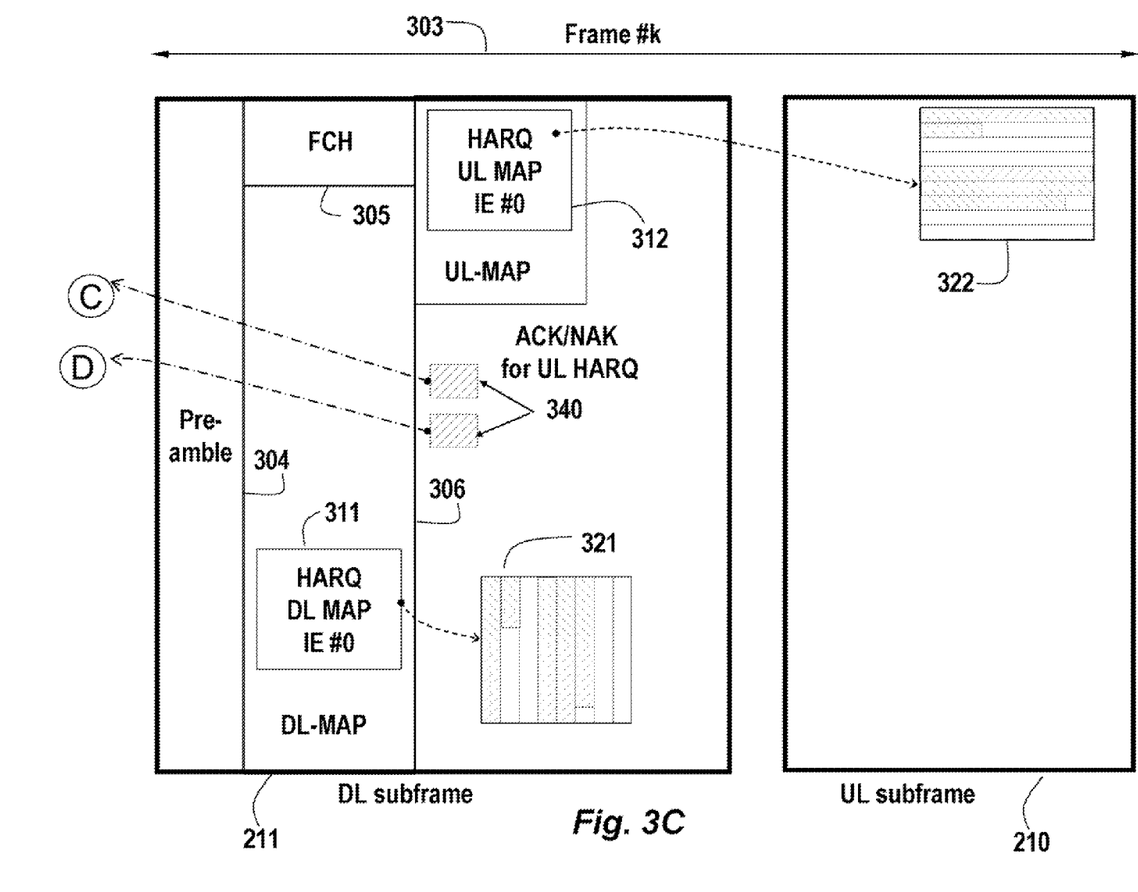

The resource allocated to each sub-burst is indicated in the HARQ DL MAP IE and HARQ UL MAP IE, while ACID, AI_SN and SPID, for incremental redundancy only, are contained in the mode-dependent IE to identify the subpacket. FIGS. 3B-3C also show the HARQ DL and UL ACK and NAK 340.

Adaptive Extended ACID

In the current standard, the ACID field is four-bit long, which can, at most, support 16 HARQ channels per MAC connection. This can lead to a performance bottleneck, as a wide variety of bandwidths can be used for IEEE 802.16e standard system. Given a four-bit long ACID field, the maximum number of subpackets that can be transmitted in a downlink subframe in parallel is $2^4=16$.

Given the fact that each HARQ PSDU can be at most 3000 byte long, the maximum number of bits transported by HARQ in a downlink subframe is $16 \times (3000 \times 8) = 0.384 \times 10^6$. If we assume the most efficient FEC coding rate, which is 5/6, the actual number of bits is $$0.384 \times 10^6 \times (6/5) = 0.4608 \times 10^6.$$

We note that the synchronized acknowledgement is not returned by the MS or SS until, at earliest, one frame later. Thus, the maximum number of physical layer bits transported by HARQ within two OFDMA frame time is $0.4608 \times 10^6 / 40 \times 10^{-3} = 11.52$ M bps, provided that each OFDMA frame is 20 ms long. On the other hand, the raw data rate for a 20 ms long OFDMA frame that uses 10 MHz bandwidth (FFT size=1024, cyclic prefix=1/32, sampling rate=28/25) could be as high as 46 Mbps. Thus, the channel bandwidth and system capacity are underutilized. It is desired to correct this.

If we extend the ACID field, then the number of parallel HARQ channels that can be supported is increased, thereby improving the system capacity. One solution is to expand the current 4-bit long ACID field to be 8-bit long, which is sufficient to represent a wide range of number of parallel HARQ channels, e.g., from 0 to 255. In addition, it is also easier to align the byte boundary in related messages and information elements. For example, the DL HARQ Chase sub-burst IE has the following format, after the ACID field is extended to be eight bits long.

TABLE 3

DL HARQ Chase sub-burst IE format

| Syntax | Size |
|---|---|
| DL HARQ Chase sub-burst IE( ) { | |
|   N sub burst[ISI] | 4 bits |
|   N ACK channel | 4 bits |
|   For ( j = 0; j <N sub burst; j++) { | |
|     RCID_IE( ) | Variable |
|     Duration | 10 bits |
|     Sub-Burst DIUC indicator | 1 bit |
|     Reserved | 1 bit |
|     If (Sub-burst DIUC indicator == 1) { | |
|       DIUC | 4 bits |
|       Repetition Coding Indication | 2 bits |
|       Reserved | 2 bits |
|     } | |
|     *ACID* | *8 bits* |
|     AI_SN | 1 bit |
|     ACK disable | 1 bit |
|     Dedicated DL Control indicator | 2 bits |
|     If (LSB #0 of Dedicated DL Control Indicator == 1) { | |
|       Duration (d) | 4 bits |
|       If (Duration != 0b0000) { | |
|         Allocation Index | 6 bits |
|         Period (p) | 3 bits |
|         Frame offset | 3 bits |
|       } | |
|     } | |
|     If (LSB #1 of Dedicated DL Control Indicator == 1) { | |
|       Dedicated DL Control IE ( ) | Variable |
|     } | |
|   } | |
| } | |

Each related information element such as DL HARQ IR CTC sub-burst IE, DL HARQ IR CC sub-burst IE, MIMO DL Chase HARQ sub-burst IE, MIMO DL IR HARQ Sub-burst IE, MIMO DL IR HARQ for CC sub-burst IE, MIMO DL STC HARQ sub-burst IE, UL HARQ Chase sub-burst IE, UL HARQ IR CTC sub-burst IE, UL HARQ CC sub-burst IE, MIMO UL Chase HARQ sub-burst IE, MIMO UL IR HARQ for CC sub-burst IE, MIMO UL STC HARQ sub-burst IE is modified accordingly to support an 8-bit ACID field.

For cases in which only minimal functionalities of the IEEE 802.11e standard are required, it may not be necessary to add hardware e.g., buffers, in a transceiver to support a large number of parallel HARQ channels.

Therefore, according to one embodiment of the invention, an adaptive increase in the number HARQ channels is provided. A large number of HARQ channels are used when a high performance is desired, while a small number of HARQ channels are used when the implementation cost is a concern.

Note that two implementation of HARQ are supported, namely:

Per-terminal: HARQ is enabled for all active CIDs for a station. If HARQ is supported, SS supports per-station implementation.

Per-connection: When the utilization of HARQ is on a per-connection basis, HARQ can be enabled on a per CID basis by using dynamic service addition (DSA) and registration (REG) messages. If HARQ is supported, the MS supports a per-connection implementation.

Therefore, the actual number of HARQ channels to be used in the HARQ operation by a terminal can be negotiated and specified for a terminal using SS Basic Capability Request (SBC-REQ) and SS Basic Capability Response (SBC-RSP) messages with a network entry or re-entry procedure. The number of HARQ channels can be further adjusted for each individual MAC connection by the DSA and REG messages.

The type-length-value (TLV) defined as follows.

Table 4: Maximum length of ACID field capability in IEEE 802.16e-2005, namely OFDMA SS demodulator TLV (Section 11.8.3.7.2 of IEEE 802.16e-2005), and OFDMA SS modulator TLV (Section 11.8.3.7.3 of IEEE 802.16e-2005), are included in the SBC-REQ and SBC-RSP messages to handle the negotiation during the network entry/retry procedure for the number of ACIDs to be used in for the HARQ operation. Table 4 and Table 5 specify the detailed format of these two TLVs. Because both TLVs are one byte long, they can exactly cover the extended range of ACIDs proposed in this invention.

TABLE 4

Extended OFDMA SS Demodulator TLV

| Type | Length | Value | Scope |
|---|---|---|---|
| 161 | 1 | *The number of DL HARQ channels* | SBC-REQ SBC-RSP |

TABLE 5

Extended OFDMA SS Modulator TLV

| Type | Length | Value | Scope |
|---|---|---|---|
| 153 | 1 | *The number of UL HARQ channels* | SBC-REQ SBC-RSP |

As described above, although SBC-REQ and SBC-RSP can help configure the number of DL and UL HARQ channels to be used during the network entry/re-entry phase, DSA-REQ/DSA-RSP and REG-REQ/REG-RSP messages can still adjust the number for each individual connection, if the HARQ is enabled on a per MAC connection basis. To fulfill this goal, the "HARQ Service Flows" TLV newly defined in IEEE 802.16e-2005 for service flow management encodings (Section 11.13.32 of IEEE 802.16e-2005) is slightly modified. The new interpretation of the "value" field is shown in bold and italic font below in Table 7.

TABLE 6

Extended HARQ Service Flows TLV

| Type | Length | Value | Scope |
|---|---|---|---|
| [145/146].44 | 1 | 0 = Non HARQ (default)<br>*1=HARQ Connection, and support 1 HARQ channel*<br>*2 = HARQ Connection, and support 2 HARQ channels*<br>...<br>*255 = HARQ Connection, and support 255 HARQ channels* | DSA-REQ, DSA-RSP, REG-REQ, REG-RSP |

So, the revised "HARQ Service Flows" TLV not only can indicate whether the connection uses HARQ or not, but also indicate the number of HARQ channels that the HARQ transmitter desire to use. When this TLV appears in REG-REQ and REG-RSP, it is only relevant to basic, primary or secondary connections.

HARQ on Relay Links

Figure 4:
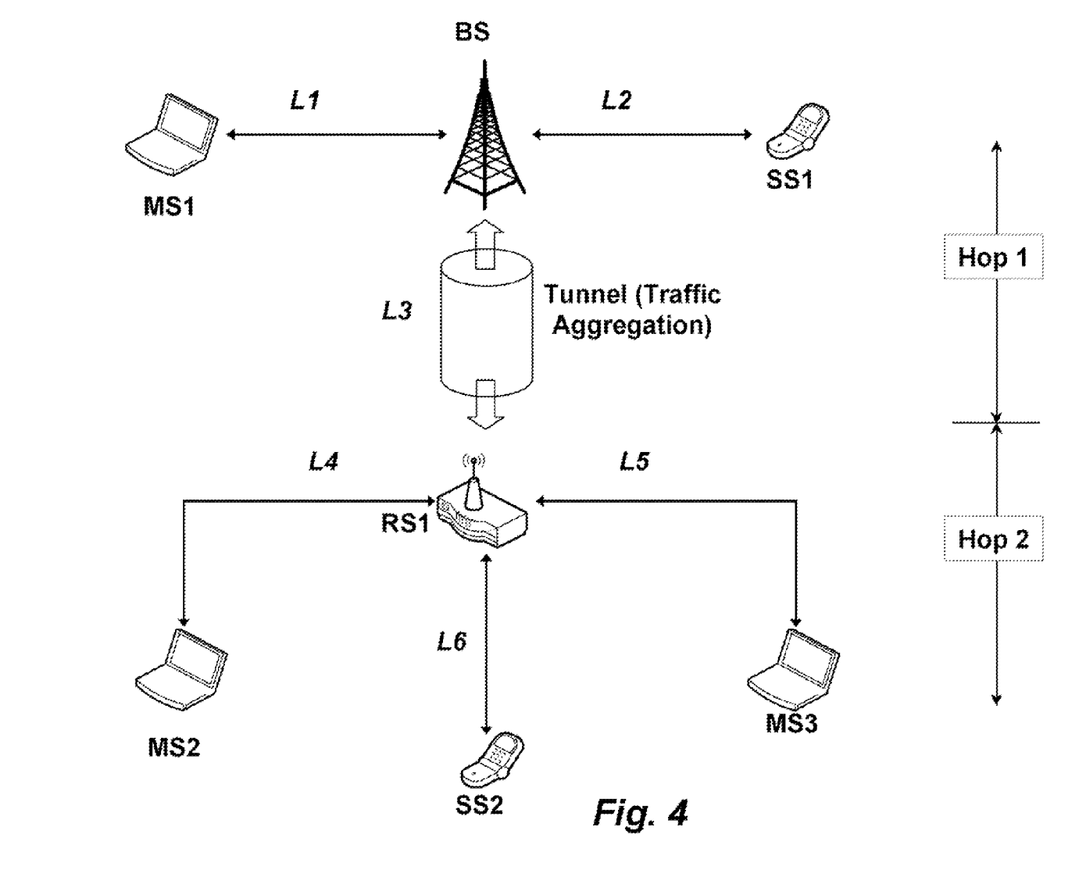
FIG. 4 is a topology of a relay network according to an embodiment of the invention.

Note that the extended ACID field and adaptive ACID negotiation are also applicable for the communication between the BS and a relay station (RS) in a mobile multihop relay network as shown in FIG. 4.

FIG. 4 shows a portion of the multihop (hop 1 and hop 2) relay network that includes a base station (BS), a relay station (RS1), mobile stations MS1, MS2, and MS3, and subscriber stations SS1 and SS2. The links to the base station are L1 and L2. The links to the relay station are L4, L5, and L6. Link L3 between the base station and the relay station provides a tunnel for traffic aggregation between the base station and the relay station.

As shown in FIG. 4, relay links carry aggregated base station traffic destined to or originated from a multitude of MSs and/ or SSs. To facilitate the handling of aggregated traffic on the relay links, the concept of tunneling has been described. With tunneling on link L3, a group of MAC connections are aggregated together and a new tunnel CID is assigned to uniquely identify the group of connections.

Two slightly different operation modes can be adopted for tunneling.

(1) Encapsulation: MPDUs that belong to various connections are concatenated together and a new tunneling MAC header is attached in front of the MPDU concatenation, see FIG. 5. The tunneling MAC header may assume the format of a generic MAC header defined in IEEE 802.16e-2005.

(2) Non-encapsulation: Concatenated MPDUs that belong to various connections are transmitted directly, without the attachment of an additional tunneling MAC header, see FIG. 6. This non-encapsulation mode improves the efficiency of the protocol.

However, if the tunneling at the MAC layer operates in conjunction with HARQ, confusions and ambiguities can arise, which eventually may lead to errors. Several examples are described below to illustrate potential problems.

In the IEEE 802.16/802.16e standards, HARQ can be applied on both a single MAC PDU and a concatenation of multiple MAC PDUs, as shown in FIG. 1. However, all the standard related information elements, namely DL HARQ Chase sub-burst IE, DL HARQ IR CTC sub-burst IE, DL HARQ IR CC sub-burst IE, MIMO DL Chase HARQ sub-burst IE, MIMO DL IR HARQ Sub-burst IE, MIMO DL IR HARQ for CC sub-burst IE, MIMO DL STC HARQ sub-burst IE, UL HARQ Chase sub-burst IE, UL HARQ IR CTC sub-burst IE, UL HARQ CC sub-burst IE, MIMO UL Chase HARQ sub-burst IE, MIMO UL IR HARQ for CC sub-burst IE, MIMO UL STC HARQ sub-burst IE, are designed in such a way that for each set of ACID, AI_SN and SPID (incremental redundancy only) value, only one RCID field is included.

The format of reduced CID (RCID) information element is shown in Table 7.

TABLE 7

RCID_IE format

| Syntax | Size | Notes |
| --- | --- | --- |
| RCID_IE ( ) { | | |
|   If (RCID_Type ==0) { | | |
|     CID | 16 bits | Normal CID |
|   } else { | | |
|     Prefix | 1 bit | For multicast, AAS, padding and broadcast burst temporary disable RCID |
|     If (Prefix == 1) { | | |
|       RCID11 | 11 bits | 11 LSB of multicast, AAS or broadcast CID |
|     } else { | | |
|       If (RCID_Type ==2 ) | | |
| { | | |
|       RCID7 | 7 bits | 7 LSB of basic CID |
|     } else if (RCID_Type == 3) { | | |
|       RCID3 | 3 bits | 3 LSB of basic CID |
|     } | | |
|   } | | |
| } | | |
| } | | |

The standard also specifies that a CID of a conventional format has to be used in the place of transport CID, primary management CID, or secondary management CID. The CID of a reduced format can be applied only in the case of multicast.

The format design of all the above information elements in the current standard cannot provide sufficient support for HARQ operation, when MPDU concatenation is enabled. More specifically, if MPDUs from multiple MAC connections are concatenated, then it is unclear which connection ID should be used in the RCID field.

In addition, if multiple HARQ channels are used for a single MAC tunnel connection L3, it is possible to have out-of-order data delivery. More specifically, if two MPDUs are handled by two separate HARQ channels in parallel, the MPDU that comes later may be received successfully first by the HARQ receiver first, while the MPDU that comes earlier may experience transmission errors and received after the retransmission of a number of subpackets. Thus, there is a need for a mechanism to re-order the received HARQ PSDU at the HARQ receiver.

We describe three solutions to address the aforementioned problems.

Figure 5:
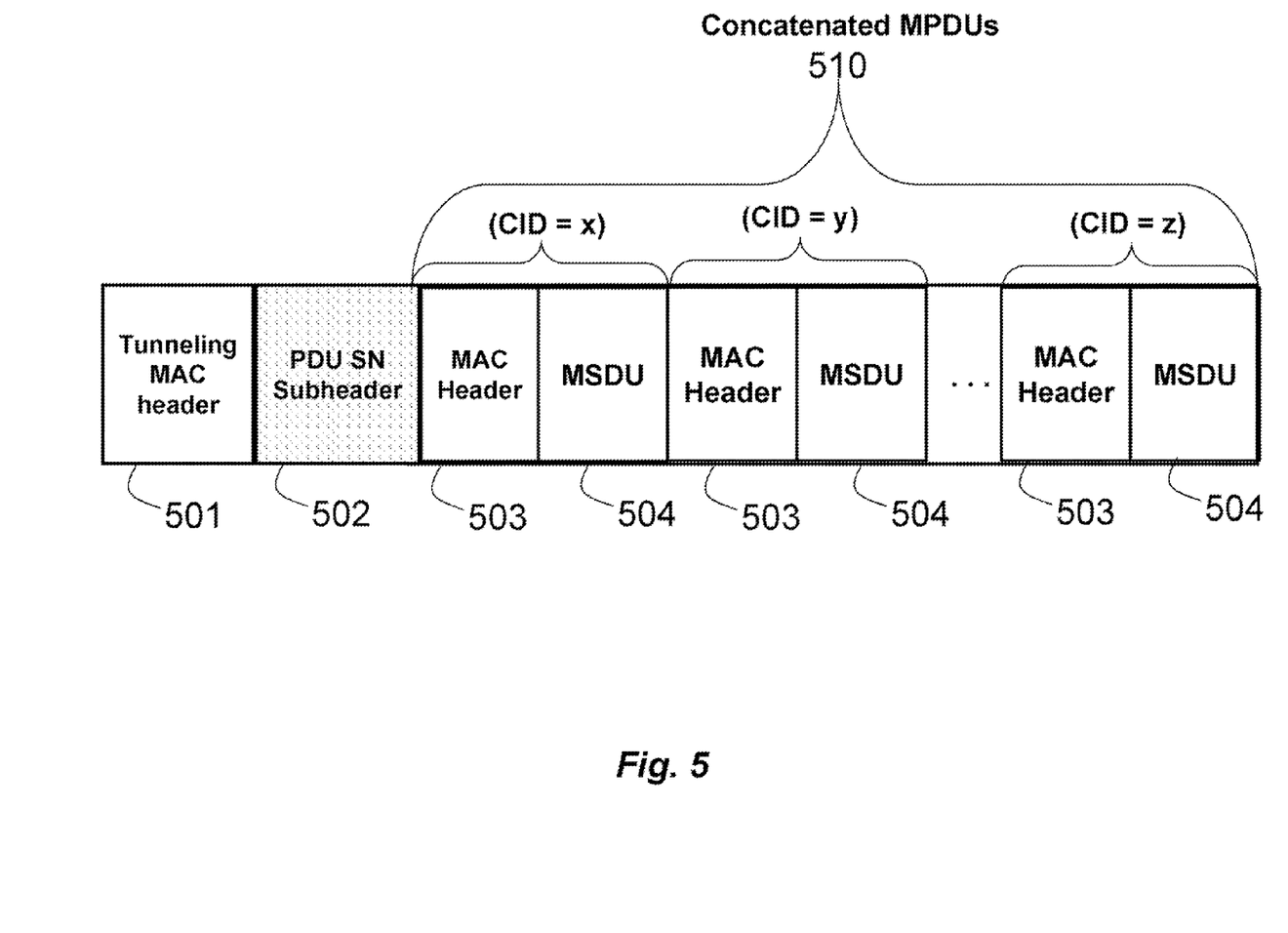
FIG. 5 is a block diagram of a format of tunnel MAC PDU in encapsulation mode with PDU SN subheader inserted.

(1) For MAC tunneling in the encapsulation mode, where at tunneling MAC header is appended in front of the concatenated MPDUs, a PDU sequence number (SN) subheader 502 is inserted between the tunneling MAC header 501 and the concatenated MPDUs 110 for HARQ operation, see FIG. 5.

the PDU SN subheader assumes the format of an extended subheader (ESH). The ESH specifies the PDU sequence number in a monotonic increasing manner. The format is described in Table 8 and Table 9 below.

TABLE 8

PDU (short) SN subheader format

| Name | Size | Description |
| --- | --- | --- |
| PDU SN (short) | 8 bits | Specify the PDU SN number |

TABLE 9

PDU (long) SN subheader format

| Name | Size | Description |
| --- | --- | --- |
| PDU SN (long) | 16 bits | Specify the PDU SN number |

In addition, we can eliminate ambiguity in the HARQ operation by putting the tunnel CID explicitly carried in the tunneling MAC header in the RCID field of these above information elements related to HARQ.

Figure 6:
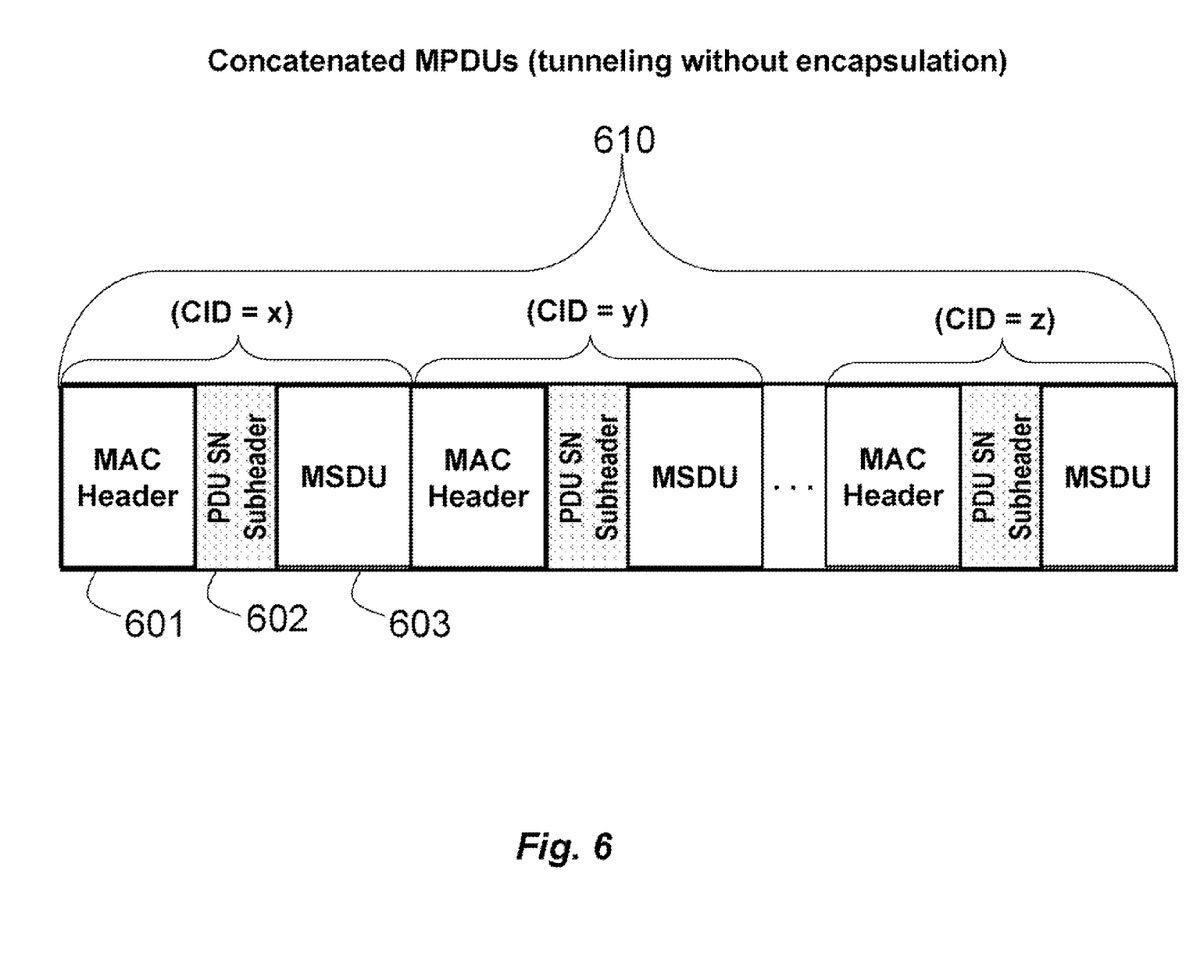
FIG. 6 is a block diagram of a format of tunnel MAC PDU in non-encapsulation mode with PDU SN subheader inserted between a generic MAC header and MSDU of each individual MPDU.

(2) For MAC tunneling in a non-encapsulation mode or MAC PDU concatenation, see FIG. 6, the PDU SN subheader 602 is inserted between the generic MAC header 601 and the MSDU 603 of each individual MPDU. Thus, the out-of-order MPDU delivery problem in HARQ can be addressed. Of course, we can also establish a tunnel for MPDU concatenation and thus attach a MAC header in front of the concatenated MPDU. In this way, MAC PDU concatenation essentially can be treated using the solution for MAC tunneling in an encapsulation mode.

Moreover, the tunneling CID can be used in the RCID field of these above information elements related to HARQ. Note that such a tunneling CID already exists after the establishment of the tunnel, although it is not explicitly carried by any field in the concatenated MPDUs.

(3) HARQ tunneling provides another solution. The concept and procedure of tunneling at the HARQ layer is similar to that at MAC layer, except that the HARQ layer tunnel is established on a link-by-link basis. More specifically, a HARQ logical connection, which is known as HARQ tunnel, is created to aggregate multiple MAC connections on a relay link. Then, the HARQ operation appends the tunnel HARQ header and the corresponding PDU SN subheader in front of the concatenated MPDUs that belong the aforementioned aggregated MAC connections. A unique HARQ tunnel CID is associated with each such tunnel and is used as the RCID in the related HARQ IEs. Note that the HARQ tunnel CID in its CID field.

The MAC layer has to be aware of the existence of such HARQ tunnels and the MAC layer performs scheduling and allocates resource for each HARQ tunnel using the corresponding HARQ tunnel CID. The resultant PDU format, which is identical to that yielded by solution 1, is shown in FIG. 5. The PDU format includes the tunneling MAC header 501, the PDU SN subheader 502, followed by concatenated MPDUs 510, each with a MAC header 503 and MSDU 504, and respective CIDs, e.g., x, y, z.

FIG. 6 shows the format for concatenated MPDUs 610 for tunneling with encapsulation. Each MSDU 603, is preceded by a MAC header 601 and a PDU SN subheader 602.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for enabling a hybrid automatic repeat request (HARQ) operation on channels between stations of an orthogonal frequency division multiple access (OFDMA) wireless communication network, comprising the steps of:
    using a tunnel connection identifier to unambiguously identify a set of media access control (MAC) protocol data units (MPDUs) adapted to be communicated over parallel HARQ channels as part of a relay media access control protocol data unit (relay MPDU);
    performing the HARQ operation using sequence numbers to avoid out-of-order delivery when the relay MPDU is transmitted over the parallel HARQ channels; and
    adaptively increasing the number of parallel HARQ channels to improve performance of the HARQ operation, in which a maximum number of parallel HARQ channels is 256.

2. The method of claim 1, in which the MPDUs are concatenated.

3. The method of claim 2, in which the connection identifier is used in place of a RCID_IE field during the HARQ operation, if the HARQ operation is applied to the concatenation of MPDUs of different MAC connections.

4. The method of claim 1, in which the MPDUs are encapsulated.

5. The method of claim 1, in which an 8-bit long field specifies the maximum number of parallel HARQ channels.

6. The method of claim 1, further comprising:
    negotiating the maximum number of the parallel HARQ channels used by a station when the station enters the network.

7. The method of claim 6, in which a subscriber basic capability request (SBC-REQ) and response (SBC-RSP) messages are used for the negotiating.

8. The method of claim 1, in which a maximum length of ACID field is a type-length-value used to indicate the maximum number of parallel HARQ channels allowed.

9. The method of claim 1, further comprising:
    negotiating the maximum number of the parallel HARQ channels used by a station when the station re-enters the networks.

10. The method of claim 1, in which a logical connection in a mobile multihop relay network is a tunnel connection between a relay station and a base station.

11. The method of claim 10, in which the logic connection is established by HARQ layer, which is called a HARQ tunnel.

12. The method of claim 11, in which a MAC header is appended in front of a group of MPDUs to be concatenated in the HARQ tunnel.

13. The method of claim 1, in which a logical connection in a mobile multihop relay network is a tunnel connection on each relay link in the wireless communications network.

14. The method of claim 13, in which the corresponding form of connection identifier for the tunnel is used in the place of RCID during the HARQ operation, if the HARQ operation is applied on the concatenation of MPDUs of different MAC connections.

15. The method of claim 13, in which the corresponding form of connection identifier for the tunnel is used in the place of RCID during the HARQ operation, if the HARQ operation is applied on the encapsulation of MPDUs of different MAC connections.

16. The method of claim 15, in which the encapsulation of MPDUs of the different MAC connections refers to appending a new MAC header before the concatenation of MPDUs of the different MAC connections.

17. The method of claim 1, in which the sequence numbers have a short format of 8-bit long.

18. The method of claim 1, in which the sequence numbers are placed in the PDU sequence number (PDU SN) extended subheader of the MPDUs, which has a format of an extended subheader according to the IEEE 802.16e-2005 standard.

19. The method of claim 18, in which the PDU SN extended subheader is placed between a MAC header appended by tunneling and the MPDUs, if encapsulation of MPDUs is used in the tunneling.

20. The method of claim 18, in which the PDU SN extended subheader is placed between a MAC header of each individual MPDU and a MAC service data unit (SDU) of each individual MPDU, if no encapsulation is made in the tunneling.

21. The method of claim 18, in which the PDU SN extended subheader is placed between a MAC header appended by HARQ layer tunneling and the following MPDUs, if HARQ tunneling is used.

22. The method of claim 1, in which the sequence numbers have a long format of 16-bit long.

23. A system for enabling hybrid automatic repeat request (HARQ) operations on channels between stations of an orthogonal frequency division multiple access (OFDMA) wireless communication network, comprising:
    means for using a tunnel connection identifier to unambiguously identify a set of MAC protocol data units (MPDUs) adapted to be communicated over parallel HARQ channels as part of a relay MPDU;
    means for performing the HARQ operation using sequence number to avoid out-of-order MPDU delivery when the relay MPDU is transmitted over the parallel HARQ channels; and
    means for adaptively increasing the number of parallel HARQ channels to improve performance of the HARQ operation, in which a maximum number of parallel HARQ channels is 256.

* * * * *